(No Model.)
2 Sheets—Sheet 1.
F. E. CROSS.
AUTOMATIC FEED FOR BAND SAWING MACHINES.
No. 516,677. Patented Mar. 20, 1894.
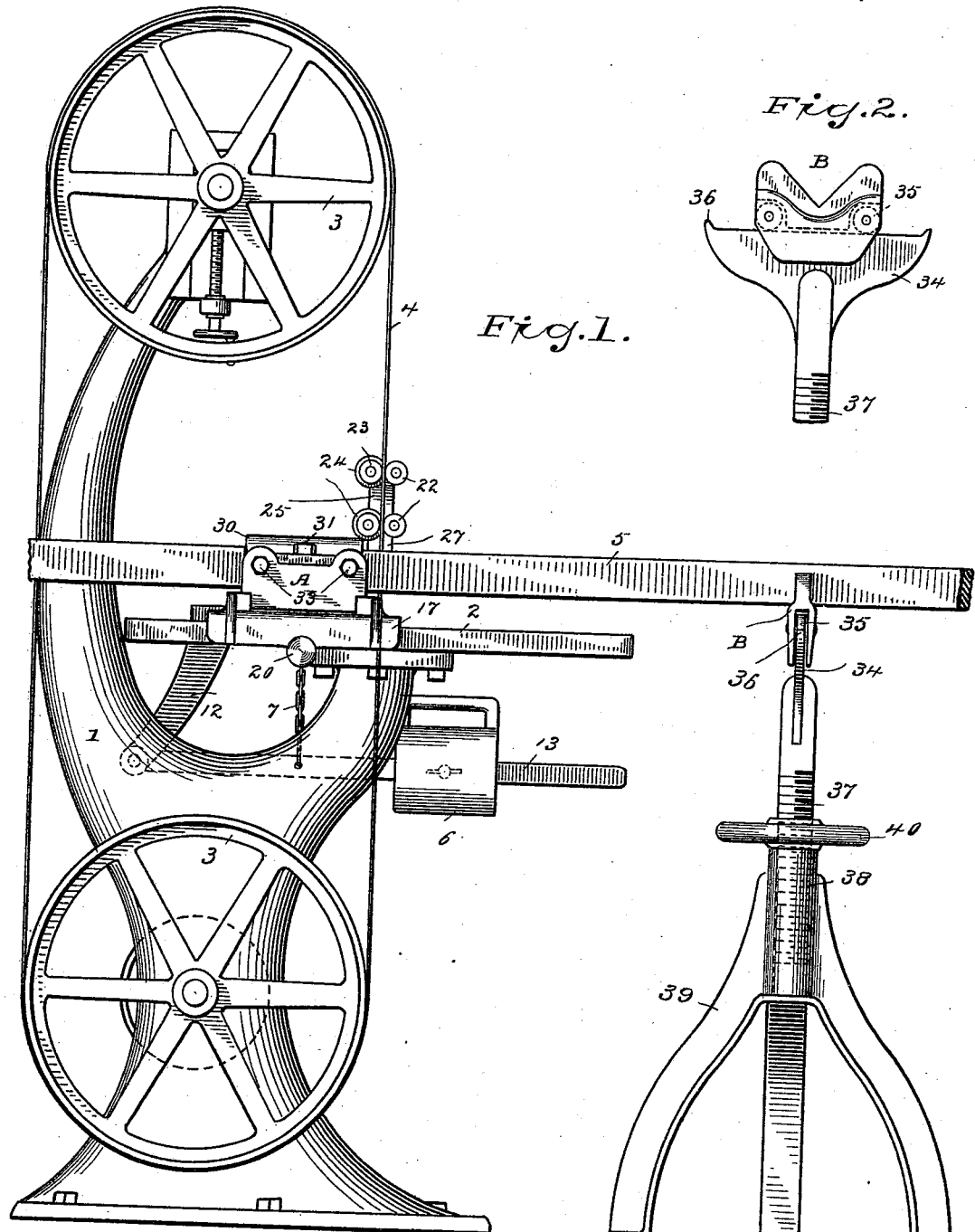
WITNESSES
H. A. Lamb
Pearl Reynolds
INVENTOR
Frederick E. Cross
By A. M. Wooster atty.

(No Model.) 2 Sheets—Sheet 2.

F. E. CROSS.
AUTOMATIC FEED FOR BAND SAWING MACHINES.

No. 516,677. Patented Mar. 20, 1894.

WITNESSES
H. A. Lamb
Pearl Reynolds

INVENTOR
Frederick E. Cross
By A. M. Wooster
Atty.

UNITED STATES PATENT OFFICE.

FREDERICK E. CROSS, OF WATERBURY, CONNECTICUT.

AUTOMATIC FEED FOR BAND SAWING-MACHINES.

SPECIFICATION forming part of Letters Patent No. 516,677, dated March 20, 1894.

Application filed May 15, 1893. Serial No. 474,218. (No model.)

*To all whom it may concern:*

Be it known that I, FREDERICK E. CROSS, a citizen of the United States, residing at Waterbury, in the county of New Haven and State of Connecticut, have invented certain new and useful Improvements in Automatic Feeds for Band Sawing-Machines; and I do hereby declare the following to be a full, clear, and exact description of the invention, such as will enable others skilled in the art to which it appertains to make and use the same.

My invention has for its object to provide an attachment which may be readily applied to any band sawing machine for the purpose of making the feed automatic.

My invention is adapted to all band sawing machines but is more especially adapted to machines used for sawing metal.

With the object in view as above stated I have devised the novel construction which I will now describe referring by numbers to the accompanying drawings forming part of this specification in which—

Figure 3:
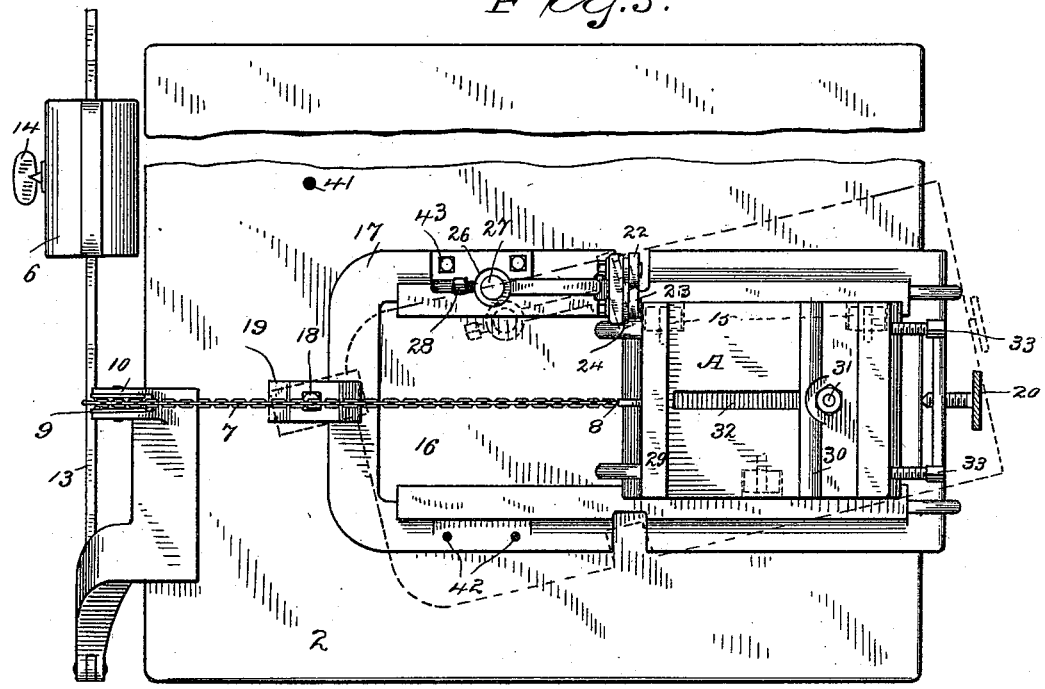
Figure 4:
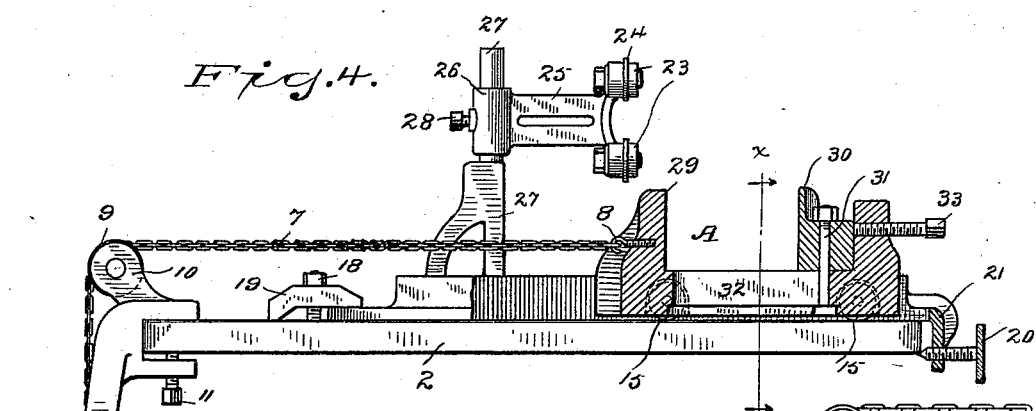
Figures 5, 6:
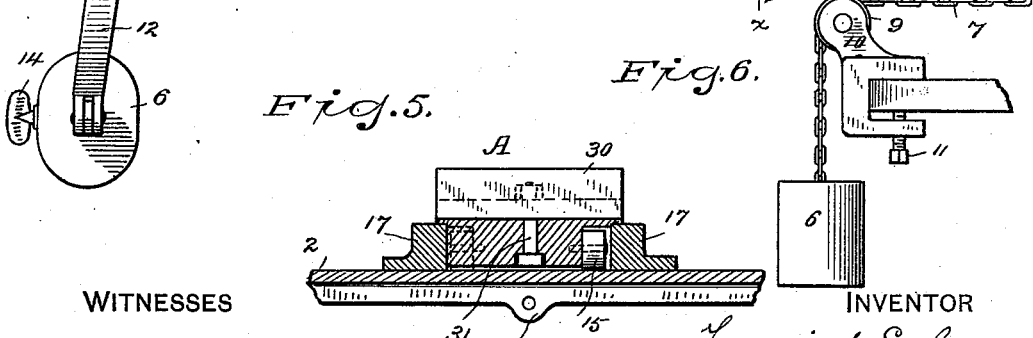

Figure 1 is a front elevation of a band sawing machine illustrating the application thereto of my novel attachment; Fig. 2, a side elevation of the carrier and the support therefor; Fig. 3, a plan view on an enlarged scale showing my novel attachment in place upon the table of a band sawing machine, the standard of the machine not being shown, and an oblique position of the frame being indicated by dotted lines; Fig. 4, a side elevation corresponding with Fig. 3 the frame and carriage being in section, the view being from the left as seen in Fig. 1; Fig. 5, a section on the line $x\,x$ in Fig. 4, and Fig. 6 is a detail view illustrating the use of a weight applied directly to move the carriage forward.

1 denotes the standard, 2 the table, 3 the carrying wheel, 4 the saw of an ordinary band sawing machine, and 5 a bar of metal that is being operated upon, my novel attachment being applicable to any of the band sawing machines of this general class now upon the market.

In use the piece of metal or wood to be sawed, which for convenience I will designate as the bar, is supported by a carriage A and a carrier B, the carriage being moved forward to place the bar in contact with the saw by means of a weight 6 and chain 7 one end of which is attached to a hook 8 on the carriage. This chain passes over a pulley 9 on a bracket 10 which is secured to the table by a set screw 11. In Fig. 6 I have shown the weight as attached directly to the chain. In Figs. 1, 3, and 4 however the bracket 10 is shown as provided with a downwardly extending arm 12 to which a lever 13 is pivoted. The chain in this form is connected to the lever on which the weight is arranged to slide. I am thereby enabled to regulate the power of the feed with the utmost exactness the weight being locked in position on the lever after adjustment by a set screw 14. The carriage runs upon rollers 15 three being shown in the drawings, which rest upon the table said carriage moving within an opening 16 in a frame 17 which is secured to the table by a bolt 18 and clamp 19 which engage one end of the frame, and a set screw 20 which passes through a lug 21 at the other end of the frame and the point of which runs slightly under the edge of the table thereby locking the frame securely in place. The saw runs between guide rollers 22 and 23 arranged in pairs, said rollers 23 being provided with flanges 24 against which the back of the saw rests. These rollers are journaled upon an arm 25 having at its opposite end a sleeve 26 which receives a standard 27 extending upward from the frame said sleeve being locked to the standard by a set screw 28. The carriage is provided with a fixed jaw 29 and a movable jaw 30 which is held in place by a bolt 31 which extends through the jaw and through a slot 32 in the bottom of the carriage. The bar is placed between these jaws the movable jaw being then set up hard against it and locked there by heavy set screws 33 which engage the rear end of the carriage and bear against the movable jaw.

When the bar to be operated upon is very much longer than the width of the carriage or is long enough so that it will not balance while on the carriage the long end of the bar is placed in a carrier B, see Figs. 1 and 2. This carrier straddles a support 34 and is provided with rollers 35 which travel on the top of the support. At the ends of the support are stops 36 which prevent the carrier from running off. Support 34 is carried by a threaded rod 37 which itself extends down into a recess cored out to receive it in a hub 38 on a suitable stand 39, for example a tripod as shown in the drawings.

40 is a hand wheel the hub of which is threaded to receive the threaded rod and which rests upon the top of the stand. It will be seen that rotation of the hand wheel must raise or lower the threaded rod and carrier so that the latter may be readily adjusted to the proper height for use. It will be noticed that I have shown the frame and carriage as placed on the left of the saw. Should it be found more convenient however to place the frame and carriage on the opposite side of the saw, i. e., the right, the change can readily be made. For the purpose of making this change I have provided an additional threaded hole 41 to receive bolt 18 and have provided bolt holes 42 in the frame to receive bolts 43 which secure the base of standard 27 to the frame it being apparent that if the frame and carriage were placed upon the right of the saw that the standard, frame and guide rollers would have to be shifted to the opposite side of the frame so as to act with the saw. The guide rollers can be raised or lowered at any time by loosening the set screw 28 and moving the arm up or down on the standard.

Should it be required at any time to operate upon a bar the inner end of which is long enough to come in contact with the standard of the machine or the opposite side of the saw, this difficulty may be readily avoided by loosening the bolt 18 and set screw 20 and shifting the frame 17 and the carriage from the position shown in full lines in Fig. 3 to a position oblique to the position shown in full lines as indicated by dotted lines in said figure. It will be seen that this will place the bar to be operated upon an angle oblique to the normal plane of the saw. As a matter of fact however the operative portion of the saw will be turned out of its normal plane by the guide rollers as indicated by the dotted position of the rollers in Fig. 3 so that it will in fact operate as usual at right angles to a bar upon the carriage. This feature of swiveling as it were the frame and carriage and also twisting the operative portion of the saw out of its normal plane of movement so that it will operate at right angles to the line of movement of the carriage, is a very important feature as it enables me to cut long bars of metal at mid length which would be otherwise impossible as the inner ends of the bars would come in contact with the outer side of the saw at the same instant they did with the operative side of the saw or else they would come in contact with the standard of the machine which would of course prevent the use of the machine upon bars the inner ends of which were too long to pass on the inner side of the standard.

Having thus described my invention, I claim—

1. A feeding attachment for band sawing machines consisting of a frame 17 having an opening, a carriage provided with fixed and movable jaws adapted to travel in said opening, suitable means for adjustably securing the frame in place, and suitable means for moving the carriage forward.

2. A feeding attachment for band sawing machines consisting of a frame having an opening 16 and a lug 21, a carriage provided with fixed and movable jaws adapted to travel in said opening, a clamp and bolt engaging the inner end of the frame, and a set screw engaging the lug at the other end of the frame whereby it is secured in place, and suitable means for moving the carriage forward.

3. A feeding attachment for band sawing machines consisting of a frame 17 having an opening, suitable means for adjustably securing said frame in place, a carriage adapted to travel in said opening and having a fixed jaw and a slot 32, a movable jaw, a bolt passing through said movable jaw and the slot whereby the jaw is held in place, set screws 33 whereby the movable jaw is locked against the bar to be operated upon, and suitable means for moving the carriage forward.

4. A feeding attachment for band sawing machines consisting of a frame having a standard extending upward therefrom and carrying guide rollers between which the saw runs, a carriage adapted to travel in the frame, suitable means for moving the carriage forward, and suitable means for locking the frame at different angles to the normal plane of the saw the operative portion of the saw being twisted from its normal plane so as to operate at all times at right angles to the carriage.

5. A feeding attachment for band sawing machines consisting of a frame having a standard extending upward therefrom, an arm 25 adjustably secured to the standard and guide rollers on the arm between which the saw runs, a carriage adapted to travel in the frame, suitable means for moving the carriage forward, and a clamp, bolt and set screw by which the frame and carriage may be adjusted at different angles to the nomal plane of the saw, the operative portion of the saw being at the same time twisted into a plane at right angles to the plane of the carriage.

6. A feeding attachment for band sawing machines consisting of a frame having an opening 16, suitable means for securing the frame in position, a carriage for the bar to be operated upon adapted to travel in said opening, a bracket 10 having a pulley 9 and an arm 12, a lever pivoted to said arm and carrying an adjustable weight, and a chain passing over said pulley and connected to the carriage and lever.

7. In a band sawing machine the combination with the table and saw, of a movable carriage for the bar to be operated upon, suitable means for adjusting the line of travel of the carriage at different angles to the normal plane of the saw and for twisting the operative portion of the saw into a plane at right angles to the line of travel of the carriage.

8. In a band sawing machine the combination with the table, saw and standard, of a frame 17 having an opening, a movable carriage for the bar to be operated upon which travels in said opening suitable means for locking the frame at different angles to the normal plane of the saw and for twisting the operative portion of the saw into a plane at right angles to the line of travel of the carriage so that a long bar upon the carriage will be cut in two before the inner end thereof will come in contact with the standard or the outer side of the saw.

9. In a band sawing machine the combination with the table, saw and standard, of a movable carriage for the bar to be operated upon, suitable means for adjusting the line of travel of the carriage at different angles to the normal plane of the saw and for twisting the operative portion of the saw into a plane at right angles to the line of travel of the carriage, and a movable carrier B and a suitable support therefor by which the outer end of the bar is carried.

10. In a band sawing machine the combination with the table, saw and standard, of a movable carriage for the bar to be operated upon, suitable means for moving said carriage forward, a carrier moving upon rollers by which the outer end of the bar is supported, and a vertically adjustable support upon which the carrier travels.

11. In a band sawing machine the combination with the table, saw and standard, of a movable carriage for the bar to be operated upon, suitable means for adjusting the line of travel of the carriage at different angles to the normal plane of the saw and for twisting the operative portion of the saw into a plane at right angles to the line of travel of the carriage, a carrier B having rollers 35 for supporting the outer end of the bar, a support 34 having stops 36 upon which the carrier travels, a suitable stand for said support, and suitable means for raising and lowering the support on the standard.

In testimony whereof I affix my signature in presence of two witnesses.

FREDERICK E. CROSS.

Witnesses:
STELLA A. BRONSON,
FREDERICK W. LA FORGE.